Figure 1:
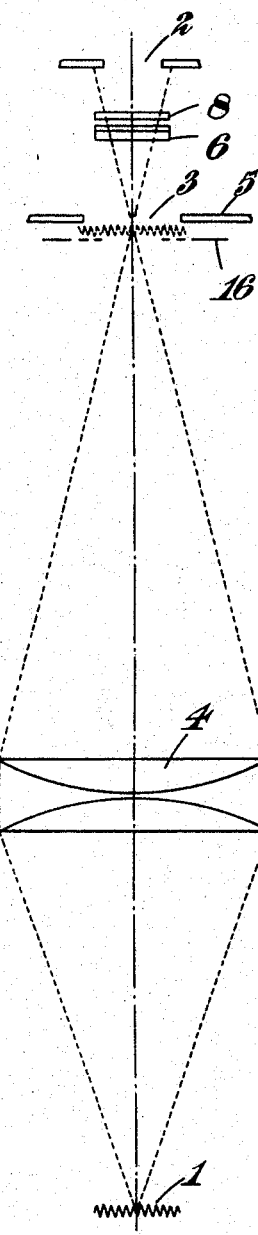

July 21, 1936.  W. CHAPMAN  2,047,940

COLOR PHOTOGRAPHY

Filed March 4, 1935  2 Sheets-Sheet 1

Inventor
Walter Chapman
By Watson, Coit, Morse & Grindle
Attorneys.

July 21, 1936. W. CHAPMAN 2,047,940
COLOR PHOTOGRAPHY
Filed March 4, 1935 2 Sheets-Sheet 2
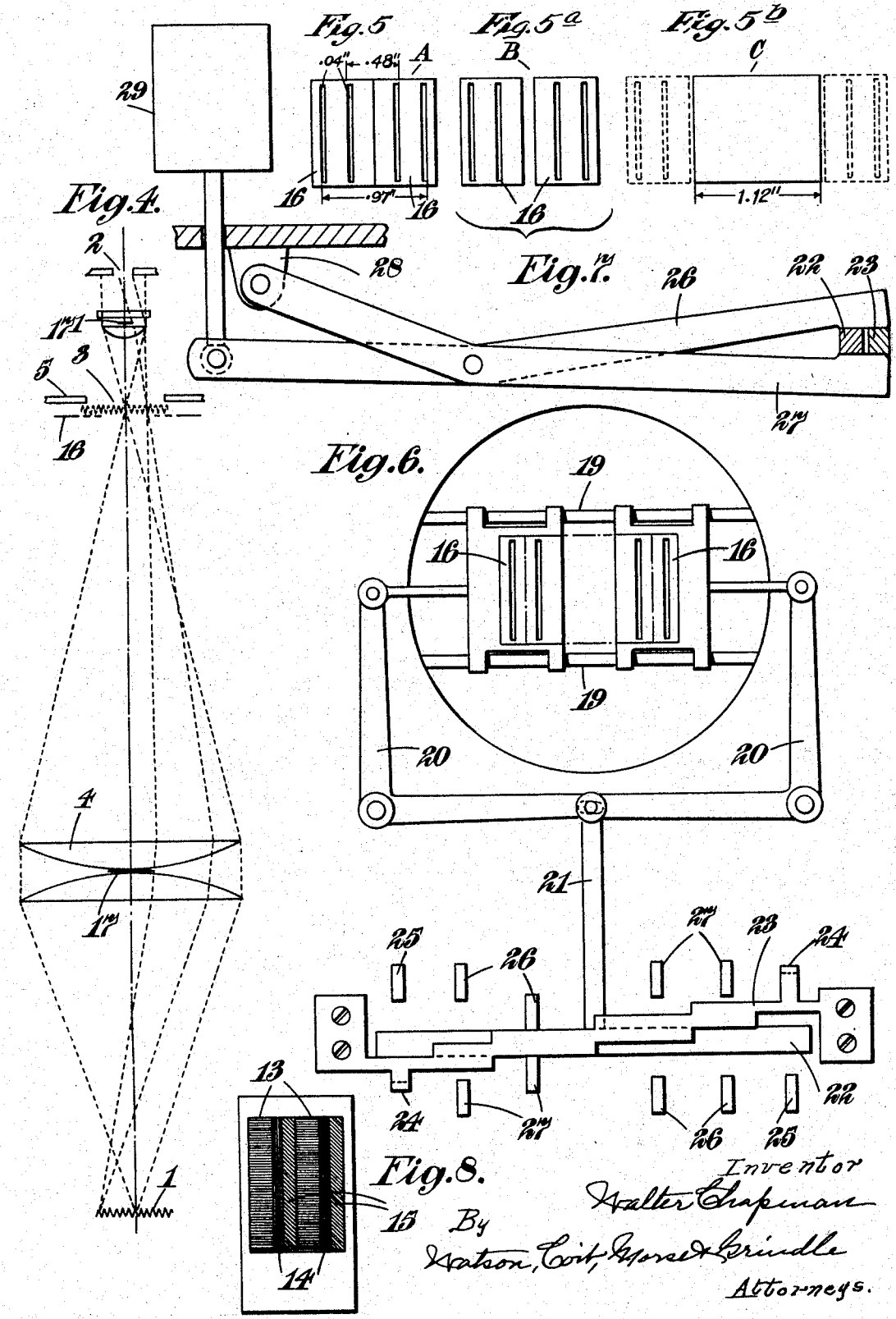

Patented July 21, 1936

2,047,940

UNITED STATES PATENT OFFICE 2,047,940

COLOR PHOTOGRAPHY

Walter Chapman, London, England, assignor to Dufaycolor Limited, London, England, a British company Application March 4, 1935, Serial No. 9,336
In Great Britain December 4, 1934

8 Claims. (Cl. 95—75)

This invention consists in improvements in or relating to color photography and has reference to the reproduction of color photographs of the kind associated with a multi-color screen composed of regular figures (e. g. lines and squares) by printing on to a photographic emulsion also associated with a multi-color screen composed of regular figures. One form of multi-color screen (see United States Patent No. 1,805,361) is composed of a series of lines of one color alternating with lines of squares of two other colors and the present invention will hereinafter be described with reference to this form of screen (which will be referred to as the form described) although the invention is not limited to this particular regular screen.

Among the objects of the invention is to provide a new or improved method of printing multi-color screen photographs in which a light beam of form particularly well adapted for printing such photographs is employed. A further object is to provide a method whereby the moire effects, which occur when photographs of the kind referred to are printed, are reduced or eliminated without at the same time causing undue loss of definition of the image, and whereby the colors of the master are particularly faithfully and brilliantly reproduced on the copy.

It has already been proposed to employ, during printing of multi-color screen photographs devices which produce on the copy screen a plurality of images, or a diffused image, of each of the master screen elements for the purpose of reducing moire and of improving the colors of the copy.

The present invention provides the method of contact printing a master photograph (negative or positive) on multi-color screen material composed of regular figures on to multi-color screen copy material also composed of regular figures in which the master and copy are passed, preferably continuously, across a printing gate in the form of a narrow slot (usually about ⅜ inch in width) and of length at least equal to the width of the picture, and in which the optical system employed for the printing light comprises a large angle condenser arranged to project an image of the light source in combination with a cylindrical lens placed with its axis substantially parallel to the length of the slot and with its principal focus at, or adjacent to, the image of the light source aforesaid, the arrangement being such that the cylindrical lens directs light from that image through the printing gate. By this method the printing beam diverges in the direction of the length of the gate and may be arranged to fill the slot in that direction while it will be substantially parallel in a direction across the width of the slot, if a light source of small dimensions and a plain cylindrical lens are employed.

In order, however, to produce a diffusion of the images of the master screen elements on the copy screen for the purpose of reducing moire and of improving the colors it is preferred to produce an image of the light source projected by the condensing lens which is large compared with the width of the slot.

The light transmitted through the cylindrical lens, from any portion of the image lying off a plane passing through the optical axis of the system and parallel to the printing slot will emerge approximately parallel from any given point on the image; but its direction of emergence will be inclined to the light from the central line of the image. This inclination will lie largely in a direction at right angles to the axis of the cylindrical lens and the length of the printing slot.

Preferably the cylindrical lens has a width at least double that of the printing slot in order that the lens may be of practical dimensions and consequently the light emerging from the lens will illuminate an area much wider than the printing slot. According to a preferred feature of the present invention the light emerging from the cylindrical lens is divided into two portions which overlap at the printing gate by forming on the cylindrical lens two facets at an angle less than 180° with each other and with their line of intersection parallel with the axis of the lens. With this arrangement the proportion of useful printing light is considerably increased.

It is important when printing color photographs of the multi-color screen type to employ a light source of constant color composition and therefore any arrangement which is employed for varying the light intensity must be such as not to vary the color composition. According to a further preferred feature of this invention variable shutters are employed to moderate the light intensity and are arranged not to reduce substantially the overall dimensions of the image of the light source produced by the condensing lens.

The invention includes apparatus for use in contact printing a master photograph (negative or positive) on multi-color screen material composed of regular figures on to multi-color screen copy material also composed of regular figures by the method described above and comprising in combination a printing gate in the form of a narrow slot (usually about ⅜ inch in width) and of length at least equal to the width of the picture, a light source, and an optical system comprising a large angle condenser arranged to project an image of the light source, and a cylindrical lens with its axis substantially parallel to the length of the slot and with its principal focus at the plane of the image of the light source aforesaid, the arrangement being such that the cylindrical lens directs light from that image through the printing gate.

Figure 2:
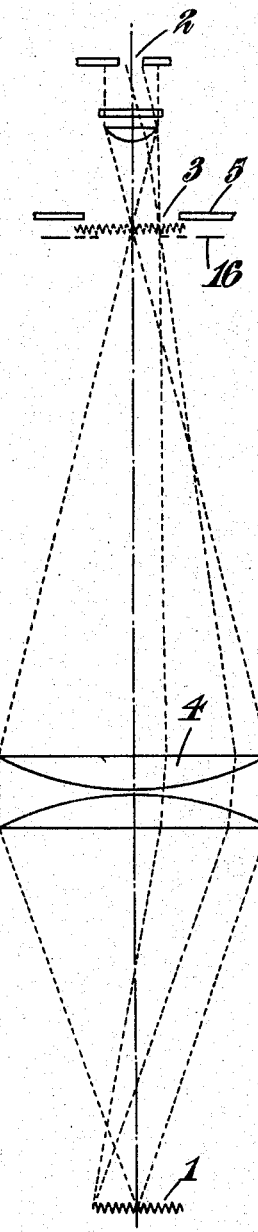
Figure 3:
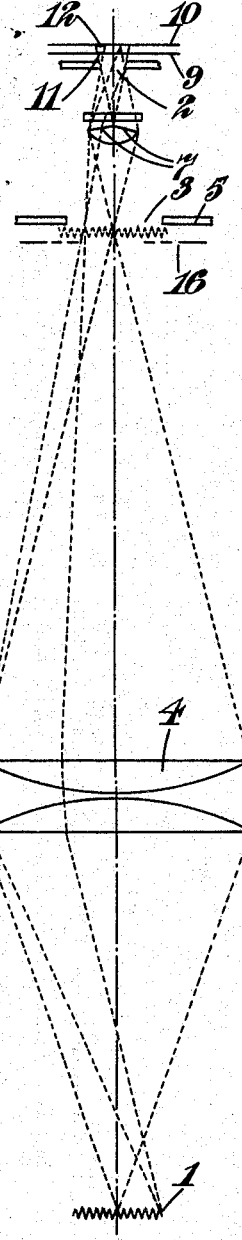

The invention will now be described by way of example with reference to the accompanying diagrammatic drawing in which:

Figure 1 represents a section of the optical system in a plane containing the axis of the cylindrical lens and the centre line of the printing slot, Figures 2, 3 and 4 are sections through the optical system in a plane at right angles to that of Figure 1, Figures 5, 5a and 5b illustrate the variable shutters in three positions, Figure 6 illustrates one way in which movement of the shutters may be effected, Figure 7 is a view of part of the mechanism shown in Figure 6 in a plane at right angles to the plane of that figure, and Figure 8 shows one form of light filter.

Referring first to Figures 1 to 3, the light source is represented by 1 and may be, for example, a projector type of electric filament lamp, and has large overall dimensions compared with the width of the printing slot 2 as shown in Figures 2 and 3. An image of the light source is formed in a plane 3 by means of a large angle condensing lens 4, a mask 5 being provided to delimit the dimensions of the image, and to cover the grid slits not required (as will be described later). A cylindrical lens 6 is arranged with its principal focus in the plane 3, and with its axis parallel to the length of the printing slot so that as shown in Figure 1 the diverging beam from the image of the light source at 3 passes through the lens without deviation in the direction of the length of the slot and at least fills the slot in this direction. In the direction corresponding to the width of the slot, however, light from any point of the image emerges from the cylindrical lens substantially parallel although, as shown in Figure 2, the beam as a whole will not be parallel due to the substantial size of the light source.

The width of the cylindrical lens is made at least twice that of the slot in order that the lens may be of practicable radius with the result that, with a plain cylindrical lens as shown in Figure 2, the beam emerging from the lens is of width greater than that of the printing slot whereby a considerable amount of available light is wasted. In order that the maximum amount of light may be usefully employed two facets are cut on the lens as shown at 7 in Figure 3, the angle between the facets being so chosen that the beams from the two halves of the lens overlap at the printing slot and substantially fill the width of the slot.

To produce the best results as to brilliancy of color and minimum moire the diffusion of the images of the master screen elements of one color on the copy screen should be such that these images completely cover the copy screen. Since, however, the color elements of a screen of the form described, to which form the present example refers, are not all equal in size and shape, the continuous line having only a width of one half of the side of a square element, it is preferred to select empirically that lens which has the best focal length and aperture to give the best compromise between diffusion and definition to suit the pitch of color screen and thickness of base materials employed. In Figure 3 the master film is represented by 9 and the copy film by 10 and it will be seen that with a suitable small spacing between the two films the image of a master screen element 11 will be considerably enlarged on the copy screen as shown at 12 and will overlap more than one element of the copy screen. Each element of the master screen will have an enlarged image formed on the copy screen and these images will of course overlap one another, thereby ensuring that each element of the copy screen is illuminated by light passing through a master element of similar color.

When printing multi-color screen photographs it is usually desirable to eliminate from the printing light those colors which would be transmitted by two or more colors of the copy screen and for this purpose sharp cut spectrum filters 8 are employed, located between the cylindrical lens and the printing gate. The cross section of the beam is filled with one or more sets of filters; each filter being a parallel strip placed along the length of the cylindrical lens and of such width as to give the correct color mixture. Preferably two sets of filters are employed, one set to each side of the axis of the lens. A suitable set of filters is shown in Figure 8 in which 13 represents the blue strips, 14 the red strips and 15 the green strips, the transmission of the several strips being so narrow that none of them passes any substantial amount of light which would be transmitted by any of the screen elements of different color.

In order that the intensity of the printing light may be varied without varying the color composition of the light or the overall dimensions of the image formed by the condensing lens a pair of shutters 16 are provided in the path of the beam at the plane of the image. The shutters are of grid formation, as shown in Figures 5, 5a and 5b, and the two grids are movable in the same or in parallel planes. When the shutters are together as shown in Figure 5 light passes through a series of slits 18 giving minimum light intensity with a large effective light source. To obtain maximum light intensity the shutters are separated until they are outside the mask 5 as shown in Figure 5b. A position of the shutters giving an intermediate light intensity is shown in Figure 5a. It is to be observed that in every position of the shutters a printing light of comparatively large overall dimensions is provided and the variation in these dimensions is so small that it will not be material.

The following is a table giving, as a specific example, ten positions of shutters having the relative dimensions shown in Figures 5, 5a and 5b in which the effective aperture is increased by approximately 20% at each step. Between positions 4 and 5 the outermost pair of slits move behind the mask 5 and between positions 8 and 9 the inner slits move behind the fask.

| Position | Total width of slits | Width of centre opening | Total width of opening |
| --- | --- | --- | --- |
| No. 1 | .16 | 0 | .16 |
| No. 2 | .16 | .04 | .20 |
| No. 3 | .16 | .09 | .25 |
| No. 4 | .16 | .15 | .31 |
| No. 5 | .08 | .30 | .38 |
| No. 6 | .08 | .39 | .47 |
| No. 7 | .08 | .49 | .57 |
| No. 8 | .08 | .64 | .72 |
| No. 9 | 0 | .90 | .90 |
| No. 10 | 0 | 1.12 | 1.12 |

The operating mechanism for moving the shutters is shown in Figures 6 and 7. The shutters are slidably mounted on guides 19 and coupled to each shutter is a bell-crank 20 actuated by a single rod 21 attached to a bar 22 of uniform width. The bar 22 is constrained to move only in a direction at right angles to its length and in the plane of the rod 21 and bell-cranks 20 by fixed guides, not shown. Closely adjacent to the bar 22 is a fixed bar 23 cut in a series of steps each of which corresponds to one step of the shutter movement. The width of the bar 23 is the same as that of the bar 22 at each step except at each of the end steps where the width is slightly less than that of the bar 22. A pair of stops 24 are attached to the bar 23 at each end thereof to limit the maximum movement of the bar 22. A series of levers 25, 26 and 27 arranged for actuation by electromagnets are provided for moving the bar 22, which movement is transmitted to the shutters by the rod 21 and bell cranks 20. The end levers 25 are simple levers and move the bar against the stops 24. The intermediate levers are arranged like a pair of scissors as shown in Figure 6 with one end of the lever 27 pivoted to a fixed member 28 and the corresponding end of the lever 26 arranged for actuation by an electromagnet 29.

If the electromagnet is energized the "scissor" levers are closed against the bar 23, which forms a fixed stop, and at the same time move the bar 22 into coincidence with the appropriate step of bar 23 and the shutters into corresponding position.

The electromagnets, one for each pair of levers 26, 27 and one for each of the end levers 25, are controlled from markings on the film (e. g. notches or staples in the film) which are made at positions of change of density in the film by known methods.

With the arrangement shown in Figures 1 to 3 the light intensity at the centre of the beam is greater than that at the edges of the beam. If it is desired to obtain a more even distribution of light intensity a mask or circular, strip or other form may be inserted on the centre line of the beam as shown at 17 in Figure 4 or alternatively as shown at 17'. The use of a mask so placed reduces the amount of light which is more or less normal to the screen without reducing that which reaches the screen at a substantial angle. A mask arranged in this manner may be employed in the methods described with reference to Figure 2 or to Figure 3.

I claim:

1. Apparatus for use in contact printing a master photograph (negative or positive) on multi-color screen material of which the screen is composed of regular figures on to multi-color screen copy material of which the screen is also composed of regular figures comprising in combination a printing gate in the form of a slot extending across the direction of movement of the master and copy, a source of light which measured in a direction across the width of the printing gate, is of substantial dimensions, optical means for producing an image of said light source and a cylindrical lens located with its principal focus in the plane of the said image and its axis substantially parallel to the length of the printing gate and arranged to project from the image and through the printing gate a beam of light which as it leaves the cylindrical lens diverges in one direction but is non-diverging in a direction at right angles, the direction of divergence being across the direction of movement of the master and copy.

2. Apparatus for use in contact printing of a master photograph (negative or positive) on multi-color screen material of which the screen is composed of regular figures on to multi-color screen copy material of which the screen is also composed of regular figures comprising in combination a printing gate in the form of a narrow slot and of length at least equal to the width of the picture to be printed, a light source, and an optical system comprising a large-angle condenser arranged to project an image of the light source which, in a direction across the width of the slot, is larger than the slot and a cylindrical lens located with its axis substantially parallel to the length of the slot and its principal focus at the plane of the image of the light source aforesaid and arranged to direct light from the image through the printing gate.

3. Apparatus for use in contact printing of a master photograph (negative or positive) on multi-color screen material of which the screen is composed of regular figures on to multi-color screen copy material of which the screen is also composed of regular figures comprising in combination a printing gate in the form of a narrow slot and of length at least equal to the width of the picture to be printed, a light source, and an optical system comprising a large-angle condenser arranged to project an image of the light source which, in a direction across the width of the slot is larger than the slot, and a cylindrical lens having two facets formed on its surface at an angle less than 180° with each other and with the line of intersection parallel with the axis of the lens, the lens being located with its axis substantially parallel to the length of the slot and its principal focus at the plane of the image of the light source aforesaid and arranged to direct light from the image through the printing gate.

4. Apparatus for use in contact printing of a master photograph (negative or positive) on multi-color screen material of which the screen is composed of regular figures on to multi-color screen copy material of which the screen is also composed of regular figures comprising in combination a printing gate in the form of a narrow slot and of length at least equal to the width of the picture to be printed, a light source, an optical system comprising a large-angle condenser arranged to project an image of the light source which, in a direction across the width of the slot is larger than the slot and a cylindrical lens located with its axis substantially parallel to the length of the slot and its principal focus at the plane of the image of the light source aforesaid and arranged to direct light from the image through the printing gate, and a narrow mask located on the centre line of the beam of light projected by the optical system.

5. The combination with apparatus as claimed in claim 1 of shutters for moderating the light intensity located in the light path and consisting of two grids relatively movable from a position in which the grids are closely adjacent and light is passed substantially only between the bars of the grids, giving minimum light intensity, to a position in which the grids are widely separated and light is free to pass between the grids, giving maximum light intensity.

6. The combination with apparatus as claimed in claim 1 of shutters for moderating the light intensity located in the light path and consisting of two grids relatively movable from a position in which the grids are closely adjacent and light is passed substantially only between the bars of the grids, giving minimum light intensity, to a position in which the grids are widely separated and light is free to pass between the shutter grids giving maximum light intensity, and means for automatically moving the shutter grids in steps.

7. The combination with apparatus as claimed in claim 1 of shutters for moderating the light intensity located in the light path and consisting of two grids relatively movable from a position in which the grids are closely adjacent and light is passed substantially only between the bars of the grids, giving minimum light intensity, to a position in which the grids are widely separated and light is free to pass between the grids giving maximum light intensity, and means for automatically moving the shutter grids comprising a fixed stop of predetermined configuration, a member operatively coupled to the shutter grids to transfer movement of the member to the shutter grids, a plurality of pairs of scissor levers adapted to embrace between their arms said member and the said fixed stop and electro-magnets arranged to effect a closing movement of selected pairs of scissor levers to cause them to embrace the member and to move it into coincidence with the fixed stop.

8. The combination with apparatus as claimed in claim 1 of sharp-cut filters located in the path of the light beam projected by the optical means and arranged to cut out from that beam light of color which would be transmitted by any two colors of the master screen.

WALTER CHAPMAN.